United States Patent Office 2,794,721
Patented June 4, 1957

2,794,721
FUEL ANTIKNOCK

John D. Bartleson, Franklin, Mich., assignor to Ethyl Corporation, New York, N. Y., a corporation of Delaware No Drawing. Application August 13, 1953,
Serial No. 374,155

9 Claims. (Cl. 44—69)

This invention relates to the improvement of organolead material, and in particular to adjuvants for tetraethyllead and tetraethyllead-containing compositions.

Organolead compounds such as tetraphenyllead, tetramethyllead, tetraethyllead, dimethyldiethyllead, and the like have long been known as antiknock agents for fuel for spark ignition type internal combustion engines. Of such materials, however, only tetraethyllead has attained commercial success because of its efficacious attributes. Likewise, it has long been known that the effective utilization of such antiknock agents is enhanced by providing antiknock fluids which consist of organic halogen compounds in admixture with an organolead compound.

Organolead compounds suffer one disadvantage, particularly during storage, handling, and blending operations, namely, their inherent instability. Thus, tetraethyllead and related compounds are susceptible of deterioration which is largely dependent upon the nature of the environment. For example, it has been found that organolead antiknock agents and antiknock fluids containing the same, when in contact with certain metals, such as copper and copper-containing alloys, tend to deteriorate, even in a reducing atmosphere. Such deterioration is postulated to result from an adverse catalytic activity exhibited by such metals. In other words, it is generally believed that copper and like metals act as self-perpetuating decomposition accelerators. Another condition enhancing the deterioration of such antiknock agents is contact with air. It is generally believed that atmospheric constituents, notably oxygen and ozone, tend to oxidize one or more of the lead-to-carbon bonds with the formation of insoluble decomposition products. Under these conditions there contemporaneously occurs a color change in the dyestuff normally present in antiknock fluids such that the visual identification of the product frequently becomes difficult, if not impossible. Organolead antiknock agents are likewise decomposed on exposure to strong light, particularly sunlight. In this case the decomposition is attributed to the catalytic decomposition of the organolead compounds by ultra-violet light. It is apparent, therefore, that the exposure of tetraethyllead and tetraethyllead-containing compositions to any or all of the above environments results in a number of operational difficulties, including loss of antiknock effectiveness, the formation of sludge and other types of sediment, and the like.

When organolead-containing compositions are utilized in internal combustion engines, other difficulties are frequently encountered. For example, in spite of the high degree of efficiency of the normal scavenger complement in antiknock fluids, the accumulation of engine deposits in the engine cannot be entirely prevented. Such deposition is particularly prevalent when spark ignition engines are operated under conditions of low speed and light load, such as encountered in metropolitan driving conditions. As a result of notable improvements in fuel antiknock quality which have been made in recent years, such deposits present but a few minor problems in low compression engines. However, because of the trend in the automotive industry of utilizing high compression engines in passenger cars and trucks, the accumulation of deposits results in a number of relatively serious problems, including increased detonation, deposit-induced autoignition or wild ping, sprak plug fouling, reduction in exhaust valve life, and the like.

Of the problems previously enumerated, those of wild ping, spark plug fouling, and reduced exhaust valve life are of considerable concern to the automotive industry. This results from the fact that each time the lead concentration in the fuel is raised to coincide with increases in compression ratio to eliminate detonation, the magnitude of one or more of these problems generally increases. As a result, there is a paramount need existing for a new and improved method for altering the physical and chemical characteristics of deposits and for modifying the combustion process such that the well-known detrimental effects of the previously described deposit-induced engine phenomena can be markedly suppressed or be eliminated.

It is, therefore, an object of this invention to provide adjuvants for organolead compounds. It is likewise an object of this invention to provide means of improving compositions such as antiknock fluids and fuels which contain organolead antiknock agents. Similarly, the provision of improved organolead compositions is another object of this invention. A particular object of this invention is to provide improved tetraethyllead-containing fuels, especially those for use in spark ignition type internal combustion engines. In addition, an object of this invention is to provide methods of improving antiknock fluids such that during compounding, storage, and blending operations such materials are stabilized against the adverse effects of deteriorative environments. An additional object of the instant invention is to provide means of obviating deposit-induced phenomena of the character described hereinbefore. Other important objects of this invention will be apparent from the discussion hereinafter.

It has now been found that the above and other objects of this invention are attained by providing compositions of matter adapted for use as additives to fuel for spark-fired internal combustion engines comprising an organolead antiknock agent and, in quantity sufficient to stabilize or improve said agent, a product obtained by reaction between a phosphorus sulfide and an active hydrogen-containing amine. Therefore, the adjuvants of this invention are formed by reaction between such compounds as phosphorus pentasulfide ($P_2S_5$), phosphorous heptasulfide ($P_4S_7$), or the like and primary or secondary mono- or poly-amines. It will thus be apparent that my organolead adjuvants result from the interaction between a reactive phosphorus sulfide and any of a variety of amines which contain at least one hydrogen which is directly attached to the nitrogen atom.

The organic reactant, that is, the active hydrogen containing amine utilized in the preparation of my adjuvants can be any of the well-known aliphatic, alicyclic, aromatic, or heterocyclic primary or secondary amines which contain at least one hydrogen directly bonded to the nitrogen atom. Typical aliphatic amines include such substances as methyl amine, ethyl amine, propyl amine, isopropyl amine, and likewise the various straight and branched chain alkyl amines exemplified by the several butyl, amyl, hexyl, heptyl, octyl, and like amines up to and including about triacontyl. Additional examples of the aliphatic amines which can be employed in preparing my adjuvants include di-isopropyl amine, methylethyl amine, di-butyl amine, di-undecyl amine, di-octadecyl amine, ethenyl amine, di-butenyl amine, benzyl amine, N-methylbenzyl amine, and like substances. In general, the primary and secondary aliphatic amines used to prepare my adjuvants should contain from 1 to about 30 carbon atoms although in some instances benefits are to be derived by employing somewhat higher molecular weight amines.

The alicyclic active hydrogen-containing amines which can be used to prepare my adjuvants are exemplified by cyclohexyl amine, dicyclohexyl amine, butylcyclohexyl amine, cyclohexenyl amine, rosin amine, and the like. As in the case of the aliphatic amines my adjuvants are preferably prepared from alicyclic amines containing up to about 30 carbon atoms.

The aromatic amines which can be used to prepare the organolead adjuvants of the instant invention are substances wherein the amino group, which can be substituted with one additional hydrocarbon radical, is directly attached to an aromatic nucleus such as that of benzene, naphthalene, diphenyl anthracene, and the like. Representative members of the primary aromatic amines which can be used to prepare my adjuvants include aniline, 2-methyl aniline, 3-methyl aniline, 4-methyl aniline, 2,3-diethyl aniline, 3,4-dibutyl aniline, 2,6-dihexyl aniline, 2-methyl-4-isopropyl aniline, 2,5-dicetyl aniline, α-naphthyl amine, β-naphthyl amine, α-anthryl amine, β-anthryl amine, γ-anthryl amine, and the like. The secondary aromatic amines which can likewise be employed in preparing my adjuvants are compounds wherein one of the hydrogen atoms of the amino group is replaced with an organic radical. Such substances are typified by N-methyl aniline, N-propyl aniline, N-t-butyl aniline, N-phenyl aniline, N-cyclohexyl aniline, N-methyl-β-naphthyl amine, N-methyl-2-methyl aniline, N-cyclohexyl-2,4-dimethyl aniline, and the like.

As indicated hereinbefore recourse can be made to polyamines in the preparation of the organolead adjuvants of the present invention. That is to say, suitable adjuvants can be prepared by utilizing as a prime reactant such diamines as ethylene diamine, propylene diamine, butylene diamine, hexylene diamine, and the like as well as analogous materials in which one of the hydrogen atoms on one or more of the amino groups is replaced by an organic radical. Likewise, recourse can be made to aromatic diamines such as ortho-, meta-, and para-phenylenediamine, and similarly analogous aromatic diamines in which at least one hydrogen atom is replaced with an aliphatic, alicyclic, or aromatic radical. Furthermore, suitable adjuvants of this invention can be prepared from aliphatic, alicyclic, aromatic, or heterocyclic primary or secondary tri-, or tetra-amino compounds. In other words, as will become apparent to one skilled in the art, the prime criterion utilized to determine the nature of a suitable amine for use in accomplishing the objects of this invention is the fact that such amines can contain any feasible number of amino functions so long as at least one of them contains a hydrogen atom directly attached to the nitrogen atom. Generally speaking the amines utilized to prepare my adjuvants should contain from 1 to about 30 carbon atoms although this is contingent upon the particular type of amine in question.

While the organic reactants described thus far generally represent single chemical entities, it is frequently preferred to utilize as the reactant mixtures of the various materials, especially mixtures which are readily available as articles of commerce. For example, typical mixtures of suitable active hydrogen-containing amines are represented by nitrogen-containing naphthenic bases derived from petroleum, and nitrogen-containing coal tar bases and similar commercially available mixtures. It will thus be apparent that the active hydrogen-containing amine used to prepare my adjuvants can be a mixture of different amines of different molecular weight and degrees of substitution and containing unsaturated or saturated radicals. Furthermore, the presence of minor proportions of tertiary amines, hydrazo compounds and the like can be tolerated. Likewise, it is often advantageous to employ mixtures of two or more substantially pure amines of the character described hereinbefore so as to prepare tailor-made adjuvants for accomplishing the objectives of this invention. Other readily available mixtures of active hydrogen-containing amines will be apparent to those skilled in the art.

The phosphorus sulfide, the other prime reactant utilized in the preparation of my adjuvants is preferably a reactive compound such as $P_2S_5$ ($P_4S_{10}$) and $P_4S_7$. It is possible, however, to use certain of the other reported phosphorus sulfides under the proper reaction conditions. Furthermore, another related reagent which can be successfully utilized in preparing my reaction products is thiophosphoryl chloride, $PSCl_3$. It will likewise be apparent that under suitable conditions the various sulfides of arsenic or antimony can be similarly employed in forming organolead adjuvants for use in the present invention.

The adjuvants of this invention are readily prepared, the reaction generally requiring only the addition of a reactive phosphorus sulfide to the active hydrogen-containing amine and heating the mixture at a temperature at which the reaction takes place as evidenced by the release of hydrogen sulfide until the reaction is substantially complete. The temperature of the reaction is largely dependent upon the nature of the individual reactants although, generally speaking, temperatures in the order of about 150 to about 500° F., are satisfactory. In preparing some of the adjuvants of my invention advantages are to be obtained by conducting the reaction under super-atmospheric pressure which can be readily obtained by conducting the reaction in a closed vessel thereby taking advantage of the pressure resulting from the hydrogen sulfide so formed.

The reaction products, that is, the adjuvants of this invention, can be made in the presence of a diluent, if desired, which may or may not be subsequently removed. Such diluents are illustrated by such substances as kerosene, straight-run and catalytically cracked hydrocarbons of the diesel fuel boiling range and the like.

The nature of the reaction products forming the organolead adjuvants of this invention is contingent to a considerable degree upon the ratio of the reactants. That is to say, variations in the character of my adjuvants are achieved by utilizing different amine-to-phosphorus sulfide mole ratios from between about 0.5 to 1 to about 10 to 1.

The reaction products used as organolead adjuvants in accordance with this invention defy precise chemical definition. For example, in Kosolapoff, "Organo Phosphorus Compounds," it is indicated that notwithstanding numerous investigations of the mechanism of the reaction in question, there is little question that theoretical equations are only a crude overall representation of the reaction for the action of the amine undoubtedly proceeds by a step-wise attack upon the monolithic structure of an actual aggregate of the pentasulfide. Nevertheless, it is known that the magnitude of the amine-to-phosphorus sulfide ratio employed contributes a considerable effect upon the nature of my adjuvants.

For example, when a low organic reactant-to-phosphorus pentasulfide ratio is employed, that is, a ratio from between about 0.5 to 1 to about 2 to 1, it is generally believed that the reaction products contain a substantial proportion of material containing the characteristic chemical bonding C—M—$PS_2$. On the other hand, when a high amine-to-$P_2S_5$ ratio is employed which ratio is from about 3 to 1 to about 10 to 1, it is presumed by those skilled in the art that a substantial proportion of the product contains the characteristic grouping (C—N—)$_3$PS. Thus, it would appear that although the reaction is believed to involve chemical combination between the hydrogen atom of the functional group of the organic reactant and the phosphorus sulfide, the reaction mechanism is obscured by a number of concurrent effects including the operation of the law of mass action, reaction kinetics, steric factors as well as consideration of the nature of the prime reactants employed. It may well be that with certain pure starting materials and with carefully controlled reaction conditions and concentrations substantially pure reaction products are obtainable. However, an advantage inherent in this invention is the fact that it is not necessary to prepare substantially pure materials and further that it is generally preferred for economic reasons to utilize the reaction product in toto as an organolead adjuvant.

The organolead antiknock agent utilized in the compositions of matter of the present invention consists of an organolead compound in which lead is directly bonded to carbon atoms. Such compounds are exemplified by the lead aryls such as tetraphenyllead, and the lead alkyls such as tetramethyllead, tetraethyllead, tetrapropyllead, tetrabutyllead, dimethyldiethyllead, methyltriethyllead, and the like as well as mixtures of such compounds. Because of the generally superior characteristics of tetraethyllead and the ready accessibility thereof as an article of commerce, it constitutes a preferred embodiment of the organolead antiknock agent utilized in accordance with the instant invention.

With the various compositions within the scope of this invention the proportion of the reaction product utilized in conjunction with an organolead compound is such that there is a total of from between about 0.01 to about 0.80 theory of phosphorus. In this regard a theory of phosphorus is defined as the amount of phosphorus theoretically required to react with the lead to form lead ortho phosphate, which quantity is two atoms of phosphorus per three atoms of lead. However, generally speaking, it is sufficient to employ an organolead adjuvant of this invention such that there is an amount of phosphorus between about 0.05 and about 0.5 theory with the best overall results usually being obtained with amounts of about 0.1 to about 0.2 theory of phosphorus, the last mentioned concentrations constituting a preferred embodiment.

Regarding many of the problems frequently associated with high octane quality fuel, an anomalous situation obtains. On one hand, an effective adjuvant for organolead compounds should possess stability against deterioration in common environments, compatibility with the chemical entities with which it comes in contact, and volatility so as to possess the characteristic frequently referred to as engine inductibility. On the other hand, the mere selection of a phosphorus compound to acquire the optimum characteristics enumerated above does not necessarily assure the effectiveness of the compound in combatting such phenomena as spark plug fouling, wild ping, and the like. It is entirely probable that some empirical relationship between physical properties and effectiveness in the obviation of such problems exists, but as yet the state of the art does not contain a satisfactory relationship of this type. However, the phosphorus materials within the purview of this invention, for the most part, possess the requisite physical properties adapting them for use as organolead adjuvants and at the same time are effective in obviating engine problems of the type described hereinbefore.

It will be apparent that there exists a number of variations in employing the adjuvants of this invention. For example, a facet of this invention involves the provision of a mixture of an organolead antiknock agent such as a lead alkyl and a reaction product between an active hydrogen-containing amine and a phosphorus sulfide of the type described above. In such a case, the resulting composition can be blended with hydrocarbon fuel of the gasoline boiling range to provide an improved fuel composition which under certain circumstances does not require the utilization of organic halogen-containing material as a scavenger. It is believed that under these conditions the presence of a quantity of phosphorus as above described and chemically bonded in accordance with the requirements of the amine-phosphorus sulfide reaction product used in this invention contributes sufficient scavenging action such that the amount of deposition in the engine is suitably controlled, notwithstanding the fact that lead phosphates generally have high melting points. Likewise, in this embodiment of the instant invention the general storage characteristics of organolead compounds are frequently enhanced.

Of perhaps more practical importance is a second variant of this invention, namely the utilization of the aforesaid amine-phosphorus sulfide reaction products in organolead-containing antiknock fluids. It is well known in the art that the most convenient means of marketing and blending organolead antiknock agents is in the form of an antiknock fluid which usually contains, in addition to the lead compound, one or more organic bromine and/or chlorine compounds and an organic dye for identification purposes. On occasion such antiknock fluids likewise contain minor proportions of diluents, antioxidants, metal deactivators and the like. In line with the foregoing, therefore, a preferred embodiment of this invention involves providing improved antiknock fluids containing the requisite concentration of the above-described reaction product between an active hydrogen-containing amine and a phosphorus sulfide. Such improved antiknock fluids generally do not require the presence of a solubilizing agent or a stabilizer since the phosphorus compound itself is generally sufficiently miscible with the constituents of the antiknock fluid and imparts thereto a degree of stabilization. However, under some conditions additional benefits are to be derived by employing in the improved antiknock fluids of this invention the necessary quantities of such materials.

Still another variant of the present invention consists of providing improved fuel compositions. These normally consist of hydrocarbons of the gasoline boiling range containing a minor proportion of the aforesaid antiknock fluids of the present invention. It will be appreciated that the quantity of the antiknock fluid of the present invention utilized in my improved fuel compositions is primarily contingent upon the use for which the gasoline is intended. That is to say, when the fuel is intended for use in automotive engines such as passenger cars, trucks, buses and the like, an amount of any of my improved antiknock fluids equivalent to a lead content in the gasoline of from between about 0.53 and about 3.17 grams of lead per gallon is satisfactory. Thus, in the embodiments of this invention wherein I employ tetraethyllead as an antiknock agent such concentrations are equivalent to from between about 0.5 and about 3 milliliters of the compound per gallon. With the advent of the more recent high compression ratio internal combustion engines, however, it is becoming increasingly apparent that benefits are to be derived by employing somewhat greater concentrations of the organolead material in automotive gasoline. On this basis, therefore, automotive fuels containing up to about 4.75 grams of lead per gallon are contemplated. In contrast, when the improved antiknock fluids of the present invention are utilized in fuel for aviation engines somewhat higher concentrations are employed. Generally speaking, amounts of lead up to about 6.34 grams of lead per gallon can be utilized although somewhat lesser quantities are presently in vogue. In other words, in the tetraethyllead-containing embodiments of this invention there can be present up to about 6 milliliters of tetraethyllead per gallon as an improved antiknock fluid of my invention. Concentrations above these limits can be employed in both motor and aviation fuels, practical considerations being the prime criterion for establishing the upper concentration limit. As indicated hereinabove, in all of compositions of the present invention the amount of phosphorus is fixed within the limits above-described. Thus, in the preferred fuel embodiments of my invention there is present an amount of phosphorus as the reaction product between an active hydrogen-containing amine and a phosphorus sulfide such that there is from about 0.1 to 0.2 theory of phosphorus. In preparing the improved fuel compositions of this invention, it is usually necessary only to add the requisite quantity of the improved fluid to the fuel and by means of stirring, shaking or other means of physical agitation homogeneous fuel compositions are provided. Although the simplest means of preparing such fuels is to blend therewith the necessary quantity of an improved antiknock fluid of this invention, it is possible to add a conventional antiknock fluid to the fuel and subsequently blend therewith the necessary quantity of the reaction product between an active hydrogen-containing amine and a phosphorus sulfide. In addition to reversing this order of addition of conventional antiknock fluids and amine-phosphorus sulfide reaction product, another variant within the purview of this invention is to blend with the fuel each of the individual constituents of my antiknock fluids separately.

The following specific examples wherein all parts and percentages are by weight are illustrative of the methods which can be employed in preparing the organolead adjuvants of this invention.

Example I

To an all glass reaction vessel equipped with a stirrer was added 780 parts of a commercially available mixture of amines consisting of about 25 percent of dihexadecylamine and 75 percent of dioctadecylamine. Then was added 333 parts of $P_2S_5$ and 2340 parts of a 30 V. I. SAE-20 oil as a diluent. The entire mixture was then heated to a temperature of 500° F. with stirring for a period of 4 hours. The reaction product was then filtered while hot so as to remove a small amount of undesirable products which had formed.

Example II

To a suitable all glass reaction vessel was added 944 parts of dodecylamine and 283 parts of $P_2S_5$. The reaction mixture was heated at 260° C. for a period of 4 hours and cooled to room temperature. The reaction mixture was then diluted with 684 parts of toluene and filtered.

The reactants and reaction conditions described in the previous specific examples are merely illustrative. For example, by utilizing the above and similar reaction conditions it is possible to prepare suitable adjuvants of this invention by reacting a phosphorus sulfide such as $P_2S_5$, $P_4S_7$ and the like with such organic reactants as diamyl amine, rosin amine, tall oil amine, methyl aniline, amyl amine, ethyl amine, tetraethylene pentamine and the like. Furthermore, as indicated previously it is possible to utilize thiophosphoryl chloride in forming the adjuvants of this invention. When this is done, it is usually advantageous to utilize in the reaction mixture a hydrogen chloride acceptor. This can readily be accomplished in many cases by merely utilizing a slight excess of the amine used to form my organolead adjuvants.

To illustrate the effectiveness of the improved antiknock fluids of the present invention consideration can be given to the problem of spark plug fouling. In order to do this, recourse can be made to the following general test procedure utilizing a standard modern V-8 engine equipped with overhead valves having a 3¾" bore, a 3⁷⁄₁₆" stroke, a 303.7 cubic inch displacement and a compression ratio of 7.25 to one equipped with commercially available spark plugs. In order to establish a base line this engine is operated in conjunction with an engine dynamometer on a standard commercial fuel containing 3 milliliters of tetraethyllead per gallon as conventional antiknock fluid containing 0.5 theory of bromine as ethylene dibromide and 1.0 theory of chlorine as ethylene dichloride. This is operated under a durability schedule used for spark plug deposit accumulation patterned after road conditions experienced in city driving which are known to produce spark plug fouling of the greatest magnitude. Such operation is substantially continuous until a number of spark plug failures is detected thereby establishing a quantitative measure of the degree of spark plug fouling which can be expressed in average hours to plug failure. The engine is then freed from deposits and equipped with new spark plugs. The same procedure is repeated using the same fuel base stock to which is added an improved antiknock fluid of the present invention.

By way of example, when 300 gallons of a petroleum hydrocarbon fuel available as an article of commerce is treated with 900 milliliters of tetraethyllead in a fluid containing tetraethyllead, 0.5 theory of bromine as ethylene dibromide and 1.0 theory of chlorine as ethylene dichloride, a suitable fuel is prepared for establishing a base line of hours to spark plug failure. When the standard V-8 engine described hereinbefore is then operated on this homogeneous fuel composition it is found that in an average time of about 34 hours 3 spark plug failures have occurred.

In contrast, when a suitable quantity of the same fuel base stock is treated with an improved antiknock fluid of the present invention greatly enhanced spark plug life is obtained. For example, when 1000 gallons of the same fuel base stock is treated with 3 liters of tetraethyllead as a fluid comprising 0.5 theory of bromine as ethylene dibromide, 1.0 theory of chlorine as ethylene dichloride, and 0.2 theory of phosphors as the reaction product between di-(dodecyl)amine and $P_2S_5$, an improved fuel of the present invention results. Upon intimately mixing the aforementioned components the homogeneous fuel composition containing 3.0 milliliters of tetraethyllead per gallon is suitable for use in the above-described engine test procedure. It is found that a substantial improvement in spark plug performance as evidenced by the greater period of continuous engine operation results from the utilization of such an improved fuel of the present invention. That is to say, the average hours to three spark plug failures is substantially in excess of the base line figure of 34 hours.

When such adjuvants as those formed by the interaction of a phosphorus sulfide with an aminoid derivative of rosin, octadecyl amine, diamyl amine, and the like are utilized in accordance with the present invention comparable effectiveness regarding minimization of spark plug fouling is obtained. Without desiring to be bound by the following explanation regarding the enhanced effectiveness of the adjuvants of this invention, a tenable explanation apparently involves a proper balance between physical properties such as stability, volatility, solubility, compatibility and the like and the energy relationships or ease of decomposition which may attribute to the overall effectiveness of my adjuvants by facilitating decomposition at the proper instant in the engine cycle.

To still further illustrate the enhanced effectiveness of the organolead-containing compositions of the present invention consideration was given to the problem of wild ping. To demonstrate the effectiveness of my compositions in this regard, I subjected both a hydrocarbon fuel treated in accordance with this invention and another portion of the same hydrocarbon fuel treated with a conventional antiknock mixture to a test procedure involving the use of a single-cylinder CFR knock test engine equipped with an L-head cylinder and a wild ping counter which records the total number of wild pings which have occurred during the test periods. Such apparatus includes an extra spark plug used as an ionization gap which is installed in a second opening in the combustion chamber. A mechanical breaker switch driven at camshaft speed is also provided which, when closed, made the wild ping counter ineffective for the duration of the normal flame in the combustion chamber. The breaker is open for 80 crankshaft degrees between 70° BTC (before top dead center) and 10° ATC (after top dead center). If a flame front induced early in the cycle by deposits reaches the ionization gap during this open period, the counter registers a wild ping regardless of the audible manifestations. During normal combustion with ignition timing at TDC (top dead center) the flame front reaches the ionization gap at 15 to 18° ATC during the period wherein the points are closed and no count is made. The actual test procedure consisted essentially of operating the test engine initially having a clean combustion chamber under relatively mild cycling conditions for deposit formation until an equilibrium with regard to deposit-induced autoignition was reached. The effect of fuel treated in accordance with the instant invention is determined by comparing the test results obtained using the fuel treated with a reaction product between an active hydrogen-containing amine and a phosphorus sulfide with those obtained using a fuel treated with a conventional antiknock mixture. Since the wild ping counter records the total number of wild pings which occurred during the test procedures, a quantitative expression for the amount of deposit-induced autoignition is the number of wild pings per hour of operation. The effectiveness of my improved fuel composition in virtually eliminating deposit-induced autoignition will be apparent from the following specific examples.

*Example III*

To 100 gallons of a commercially available blend of straight-run, catalytically cracked, and polymer blending stocks was added and thoroughly mixed 300 milliliters of tetraethyllead as an antiknock fluid comprising tetraethyllead, 0.5 theory of bromine as ethylene dibromide, and 1.0 theory of chlorine as ethylene dichloride. The resulting homogeneous fuel composition was then utilized as the fuel in the previously designated single-cylinder laboratory test engine to formulate a base line of wild ping. It was found that there were 170 wild pings per hour of engine operation.

*Example IV*

An improved antiknock fluid composition of the present invention was prepared by adding 0.1 theory of phosphorus as the product obtained by reaction between $P_2S_5$ and dioctadecyl amine to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition was obtained by intimately mixing the aforementioned components. The entire quantity of improved antiknock fluid composition so prepared was added to 50 gallons of a commercially available blend of straight-run, catalytically cracked, and polymer blending stocks. Upon mechanically agitating the resulting mixture a homogeneous fuel composition was prepared. The laboratory single-cylinder test engine as described previously was then operated on this improved fuel composition while contemporaneously determining the rate of wild pings as detected by the wild ping counter. It was found that the utilization of an improved antiknock fuel of the present invention resulted in 50 wild pings per hour as contrasted with a conventional fuel which produced 170 per hour. Consequently, an improved fuel composition of this invention, when introduced into an internal combustion engine, resulted in a reduction in this deposit-induced engine phenomenon amounting to 71 percent.

The foregoing specific examples are merely illustrative of the beneficial effects produced by the improved organolead-containing compositions of the present invention. It will be apparent that it is preferred to utilize the adjuvants of this invention such as the reaction product between a phosphorus sulfide and active hydrogen-containing amines such as ethyl aniline, n-amyl aniline, ethanol amine, p-phenylene diamine, n-dodecyl phenyl amine, dihexadecyl amine and the like in high octane quality fuel because of the fact that most of the deposit-induced problems exist on combustion of such fuels.

The superior effectiveness of the preferred embodiments of this invention, namely, a reaction product between an active hydrogen-containing amine and a phosphorus sulfide in the diminution of deposit-induced engine problems is further unexpected when considering the prime constituents phosphorus and sulfur which are contained therein. On the one hand, both sulfur and phosphorus compounds have heretofore been judiciously avoided as much as possible in fuel because of their notorious deleterious effects, particularly in the realm of organolead antagonism and the like. In the case of sulfur, for example, refiners have long been resorting to various means of removing sulfur compounds from hydrocarbons of the gasoline boiling range because of their recognized deleterious effects on antiknock activity, engine cleanliness, storage stability, and the like. However, the adjuvants of this invention possessing considerable proportions of phosphorus and sulfur do not bring about such deleterious effects. Furthermore, another surprising effect has been noted, namely, the fact that the presence of phosphorus-to-sulfur bonds produces a greater effectiveness regarding wild ping than that exhibited by compounds possessing either phosphorus or sulfur and likewise, a mixture of phosphorus- and sulfur-containing compounds. This fact is evidenced by the findings that the presence of added sulfur in a conventional leaded fuel not only has no beneficial effect on wild ping but actually results in an increase in this phenomenon. By way of example, it was found that the addition of 5 theories of sulfur as a mixture consisting of 1 theory of di-t-butyl disulfide, 2 theories of di-butyl sulfide, and 2 theories of thiophene, a mixture representative of the average sulfur constituents of petroleum hydrocarbon fuel, to a conventional gasoline containing 3 milliliters of tetraethyllead per gallon resulted in a wild ping rate of 93 wild pings per hour. In contrast, the same base fuel containing the same concentration of tetraethyllead produced 74 wild pings per hour. Thus, the incorporation of sulfur-containing compounds different from the sulfur-containing adjuvants utilized in this invention resulted in a wild ping rate amounting to 125 percent of the base line. That is to say, the presence of sulfur-containing compounds generally increases the rate of wild ping whereas the presence of a considerable amount of sulfur when suitably bonded in accordance with the present invention results in a definite improvement in this deposit-induced phenomenon. In view of the foregoing, therefore, the apparent conclusion to be reached is that the chemical bonds between the two prime elements making up my adjuvants in some currently unexplainable manner produce enhanced effectiveness with regard to deposit-induced engine phenomena without resulting in secondary deleterious problems normally attributed to the presence of each of the elements when used separately or as mixtures of individual phosphorus- and sulfur-containing compounds.

As indicated, an additional important advantage obtained from practicing this invention is the fact that my adjuvants have little or no antagonistic effect upon the antiknock agent used in the fuel. In line with the enhanced effectiveness of my organolead adjuvants this surprising benefit regarding a minimum of organolead destructiveness is perhaps associated with the degree of oxidative stability inherent in a reaction product between an active hydrogen-containing amine and a phosphorus sulfide. In other words, it is not inconceivable that my organolead adjuvants are capable of decomposing at the proper instant in the engine cycle so as to exhibit the beneficial effect regarding deposit-induced engine problems while at the same time decomposing at a time during the engine cycle sufficiently far removed from the point at which the organolead compound exerts its beneficial antiknock activity.

Because of their adaptability the adjuvants of the present invention can be successfully utilized with any of the well-known organolead antiknock agents as indicated hereinbefore. Likewise, insofar as the halide scavengers are concerned, the reaction product between an active hydrogen-containing amine and a phosphorus sulfide used in this invention can be employed in antiknock fluids and fuels containing such materials as ethylene dibromide, ethylene dichloride, mixed dibromotoluenes, trichlorobenzenes, and in general such organic halide scavengers as those disclosed in U. S. 1,592,954; 1,668,022; 2,364,921; 2,398,281; 2,479,900; 2,479,901; 2,479,902; 2,479,903; and 2,496,983. Likewise, the adjuvants of this invention can be used in conjunction with other well-known motor fuel adjuvants such as antioxidants, organolead stabilizers, organic dyes, solubilizers, and indeed with other catalytically active materials frequently employed in fuel.

Having fully described the nature of the present invention, the need therefor, and the best mode devised for carrying it out, it is not intended that this invention be limited except within the spirit and scope of the appended claims.

I claim:

1. An antiknock additive for use in hydrocarbon fuels of the gasoline boiling range, said additive comprising an organolead antiknock agent and a product obtained by reaction between (1) a phosphorus sulfide selected from the group consisting of $P_2S_5$ and $P_4S_7$ and (2) an amine containing up to about 30 carbon atoms and at least one hydrogen atom directly attached to a nitrogen atom, said reaction comprising heating from about 0.5 to about 10 moles of said amine per mole of said sulfide to a temperature at which hydrogen sulfide is released; said product being in said additive in amount such that the phosphorus-to-lead atom ratio is from about 0.02/3 to about 1.6/3.

2. The additive of claim 1 further characterized in that the antiknock agent is a lead alkyl.

3. The additive of claim 1 further characterized in that the antiknock agent is tetraethyllead.

4. An antiknock additive for use in hydrocarbon fuels of the gasoline boiling range, said additive consisting essentially of tetraethyllead, a scavenging amount of organic halide material capable of reacting with the lead during combustion in a spark ignition internal combustion engine to form volatile lead halide, said material containing only elements selected from the group consisting of bromine, chlorine, carbon, hydrogen, and oxygen; and a product obtained by reaction between (1) a phosphorus sulfide selected from the group consisting of $P_2S_5$ and $P_4S_7$ and (2) an amine containing up to about 30 carbon atoms and at least one hydrogen atom directly attached to a nitrogen atom, said reaction comprising heating from about 0.5 to about 10 moles of said amine per mole of said sulfide to a temperature at which hydrogen sulfide is released; said product being present in said additive in amount such that the phosphorus-to-lead atom ratio is from about 0.02/3 to about 1.6/3.

5. The additive of claim 4 further characterized in that said scavenging amount of organic halide material is about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride.

6. Hydrocarbon fuel of the gasoline boiling range adapted for use as fuel for spark ignition internal combustion engines containing up to about 6.34 grams of lead per gallon as an organolead antiknock agent, and a product obtained by reaction between (1) a phosphorus sulfide selected from the group consisting of $P_2S_5$ and $P_4S_7$ and (2) an amine containing up to about 30 carbon atoms and at least one hydrogen atom directly attached to a nitrogen atom, said reaction comprising heating from about 0.5 to about 10 moles of said amine per mole of said sulfide to a temperature at which hydrogen sulfide is released; said product being present in said fuel in amount such that the phosphorus-to-lead atom ratio is from about 0.02/3 to about 1.6/3.

7. The hydrocarbon fuel composition of claim 6 further characterized in that it contains from about 0.5 to about 4.75 grams of lead per gallon as tetraethyllead, about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride.

8. The additive of claim 4 wherein said product is obtained by reaction between $P_2S_5$ and dioctadecylamine.

9. The composition of claim 6 wherein said product is obtained by reaction between $P_2S_5$ and dioctadecylamine.

References Cited in the file of this patent

UNITED STATES PATENTS

| | | |
|---|---|---|
| 2,378,793 | Rudel | June 19, 1945 |
| 2,405,560 | Campbell | Aug. 13, 1946 |
| 2,534,217 | Bartleson | Dec. 19, 1950 |
| 2,728,647 | Vaughn | Dec. 27, 1955 |

FOREIGN PATENTS

| | | |
|---|---|---|
| 683,405 | Great Britain | Nov. 26, 1952 |